US009084145B2

(12) United States Patent
Sakata

(10) Patent No.: US 9,084,145 B2
(45) Date of Patent: Jul. 14, 2015

(54) COMMUNICATION APPARATUS

(75) Inventor: Masayuki Sakata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 237 days.

(21) Appl. No.: 13/992,068

(22) PCT Filed: Sep. 22, 2011

(86) PCT No.: PCT/JP2011/071565
§ 371 (c)(1),
(2), (4) Date: Jun. 6, 2013

(87) PCT Pub. No.: WO2012/081291
PCT Pub. Date: Jun. 21, 2012

(65) Prior Publication Data
US 2013/0250824 A1 Sep. 26, 2013

(30) Foreign Application Priority Data
Dec. 15, 2010 (JP) ................... 2010-279330

(51) Int. Cl.
*H04W 84/18* (2009.01)
(Continued)

(52) U.S. Cl.
CPC ....... *H04W 28/065* (2013.01); *G08G 1/096716* (2013.01); *G08G 1/096791* (2013.01); *H04W 4/046* (2013.01); *G08G 1/163* (2013.01)

(58) Field of Classification Search
CPC ...... H04W 84/18; H04W 76/02; H04L 45/00; H04L 47/10; H04L 29/06095

USPC ......................................................... 370/310
See application file for complete search history.

(56) References Cited

U.S. PATENT DOCUMENTS

2002/0003783 A1* 1/2002 Niemela et al. ............... 370/329
2008/0200121 A1 8/2008 Yamamoto
2011/0255482 A1* 10/2011 Holland et al. ............... 370/329

FOREIGN PATENT DOCUMENTS

JP 2005-323189 A 11/2005
JP 2007-306547 A 11/2007
(Continued)

OTHER PUBLICATIONS

Yuichi Hagito, et al. "A Study on Hopping Part of VRCP for Integrated Inter-Vehicle and Road to Vehicle Communications", IEICE Technical Report, May 2007, pp. 37-41, vol. 107, No. 51.

*Primary Examiner* — Ronald B Abelson
(74) *Attorney, Agent, or Firm* — Sughrue Mion, PLLC

(57) ABSTRACT

A location information notifier (107) adds on usage channel information representing the communication channels that the onboard unit is using, to a location information notifying packet to be transmitted to notify the location of the onboard unit and transmits the location information notifying packet to another onboard unit that can communicate with the subject onboard unit. When the communication channels represented by the usage channel information included in the location information notifying packet transmitted from the other onboard unit are the same as the previously set two communication channels, a transmission processor (106) transmits a multi-hop packet transmitted and received by multi-hop communication, to the onboard unit.

6 Claims, 8 Drawing Sheets

(51) Int. Cl.
  *H04W 76/02* (2009.01)
  *H04L 12/701* (2013.01)
  *H04L 12/801* (2013.01)
  *H04L 29/06* (2006.01)
  *H04W 28/06* (2009.01)
  *G08G 1/0967* (2006.01)
  *H04W 4/04* (2009.01)
  *G08G 1/16* (2006.01)

(56) References Cited

FOREIGN PATENT DOCUMENTS

| | | |
|---|---|---|
| JP | 2008-205817 A | 9/2008 |
| JP | 2010-507970 A | 3/2010 |
| JP | 2010-507971 A | 3/2010 |
| JP | 2010-87701 A | 4/2010 |

* cited by examiner

COMMUNICATION APPARATUS

CROSS REFERENCE TO RELATED APPLICATIONS

This application is a National Stage of International Application No. PCT/JP2011/071565, filed on Sep. 22, 2011, which claims priority from Japanese Patent Application No. 2010-279330, filed on Dec. 15, 2010, the contents of all of which are incorporated herein by reference in their entirety.

TECHNICAL FIELD

The present invention relates to a communication apparatus, communication method and program for performing radio communication, in particular, relates to a communication apparatus built in a vehicle as an onboard unit, a communication method and program for the communication apparatus.

BACKGROUND ART

In ITS (Intelligent Transport Systems), inter-vehicle communication for exchanging information between vehicles using radio waves has been investigated, and multi-hopping, i.e., data transfer by way of multiple communication apparatuses has also been contemplated as practical specifications.

In particular, in ETSI ITS (European Telecommunications Standards Institute ITS), a plan has been developed in which, when an onboard unit (communication apparatus) engaged in the communication carries out multi-hop communication, two communication channels are used as its communication channels, and the communication channels are switched between the first stage (control channel: CCH), the second and the following stages (service channel: SCH) (see Patent Document 1, for example).

In order to realize this operation, all the onboard units have to be ones that can use two channels.

RELATED ART DOCUMENTS

Patent Documents

Patent Document 1: JP2007-306547A

SUMMARY OF THE INVENTION

Problems to be Solved by the Invention

However, in realty there can be cases where onboard units that can use only one communication are present. Alternatively, even for the onboard unit capable of handling two communication channels, SCH is assumed to use many communication channels by switching one to another. As a result, the unit can be in a state where multi-hop communication cannot be actually performed.

FIG. 1 is a diagram showing a typical configuration of multi-hop communication between onboard units. It should be noted that multi-hop communication is a contrivance that allows transmission of data (packets) to a communication apparatus residing out of the wave-reach coverage by relaying the data by way of a communication apparatus that is present in wave-reach coverage.

The configuration shown in FIG. includes onboard units 1000-1 to 1000-6 and roadside unit 2000.

Onboard units 1000-1 to 1000-6 are communication apparatuses that perform radio communication and are mounted on vehicles.

Onboard units 10001- to 1000-4 use two communication channels, CH0 and CH1 as the communication channels.

Onboard unit 1000-5 uses communication channel CH0 only as the communication channels.

Onboard unit 1000-6 uses two communication channels CH0 and CH2 as the communication channels.

Roadside unit 2000 is a communication apparatus for performing radio communication using communication CH2 only.

In this configuration, the first hop (the first stage) uses CH0 while the second (the second stage) and following hops use CH1. The first hop indicates the range in which data is transmitted from a certain communication apparatus to a communication terminal that resides in the coverage of the apparatus. The second hop indicates the range in which a communication apparatus (communication apparatus that relays data) having received the data re-transmits (transfers) that data to a further remote communication apparatus.

Here, CH0 is the communication channel which all the onboard units 1000-1 to 1000-6 can use. Further, CH1 is the communication channel that can be set up when the onboard unit can use two communication channels.

As shown in FIG. 1, data (a multi-hop packet that is exchanged in multi-hop communication) transmitted from onboard unit 1000-1 is transmitted as the first hop by CH0 to onboard unit 1000-2. Then, onboard unit 1000-2 transmits (transfers) the data transmitted from onboard unit 1000-1 to onboard unit 1000-3 as the second hop by using CH1. Onboard unit 1000-3, then transmits (transfers) the data transmitted from onboard unit 1000-2 to onboard unit 1000-4 as the third hop by using CH1.

Herein, if onboard unit 1000-5 that can use a single communication channel only is present, in the coverage of onboard unit 1000-1, onboard unit 1000-5 can receive data through CH0 but cannot transmit data by multi-hop communication using CH1.

Further, even in the case of onboard unit 1000-6 that can handle two communication channels, if the device is communicating with roadside unit 2000 by using another communication channel CH2 instead of CH1, the device cannot transmit data by multi-hop communication using CH1, similarly to onboard unit 1000-5.

In this way, if there is an onboard unit that cannot transmit data by multi-hop communication, the onboard unit that transmits data cannot recognize that fact and thus transmits data to that onboard unit. As a result, a problem arises in which there is a wasteful transmission process and in which there is a wasteful use of communication band.

The object of the present invention is to provide a communication apparatus, communication method and program that solve the above-described problem.

Means for Solving the Problems

The communication apparatus of the present invention is for performing radio communication, comprising:

a location information notifier that adds on usage channel information representing the communication channels that the communication apparatus is using, to a location information notifying packet to be transmitted to notify the location of the communication apparatus and that transmit the location information notifying packet to another communication apparatus that can communicate with the subject communication apparatus; and, a transmission processor that, when the communication channels represented by the usage channel information included in the location information notifying packet transmitted from the other communication apparatus are the same as the previously set two communication channels, transmits a multi-hop packet transmitted and received by multi-hop communication, to the communication apparatus.

The communication method of the present invention is a communication method for performing radio communication between communication apparatuses, comprising the steps of:

adding on usage channel information representing the communication channels that the communication apparatus is using, to a location information notifying packet to be transmitted to notify the location of the communication apparatus and transmitting the location information notifying packet to another communication apparatus that can communicate with the subject communication apparatus; and, when the communication channels represented by the usage channel information included in the location information notifying packet transmitted from the other communication apparatus are the same as the previously set two communication channels, transmitting a multi-hop packet transmitted and received by multi-hop communication, to the communication apparatus.

The program of the present invention is a program that causes a communication apparatus performing radio communication to execute:

a step of adding on usage channel information representing the communication channels that the communication apparatus is using, to a location information notifying packet to be transmitted to notify the location of the communication apparatus and transmitting the location information notifying packet to another communication apparatus that can communicate with the subject communication apparatus; and, a step of, when the communication channels represented by the usage channel information included in the location information notifying packet transmitted from the other communication apparatus are the same as the previously set two communication channels, transmitting a multi-hop packet transmitted and received by multi-hop communication, to the communication apparatus.

Effect of the Invention

As described heretofore, in the present invention it is possible to effect multi-hop communication efficiently.

MODE FOR CARRYING OUT THE INVENTION

As described above, the present invention is characterized by the feature for disallowing onboard units, which cannot transmit data by multi-hop, to participate in the second and following multi-hop stages.

Now, the embodiment mode of the present invention will be described with reference to the drawings.

Figure 1:
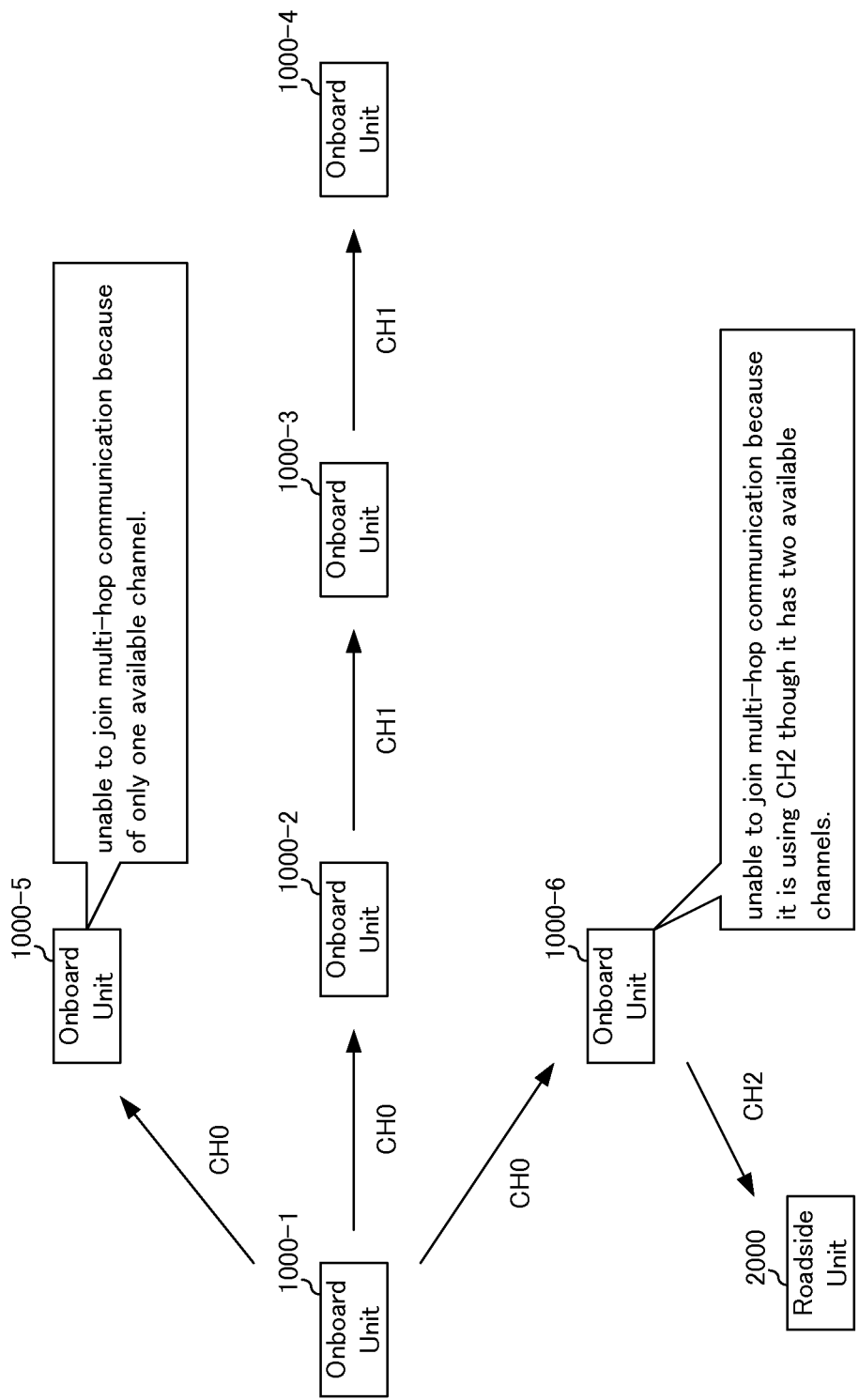
FIG. 1 is a diagram showing a configuration of multi-hop communication between typical onboard units.
Figure 2:
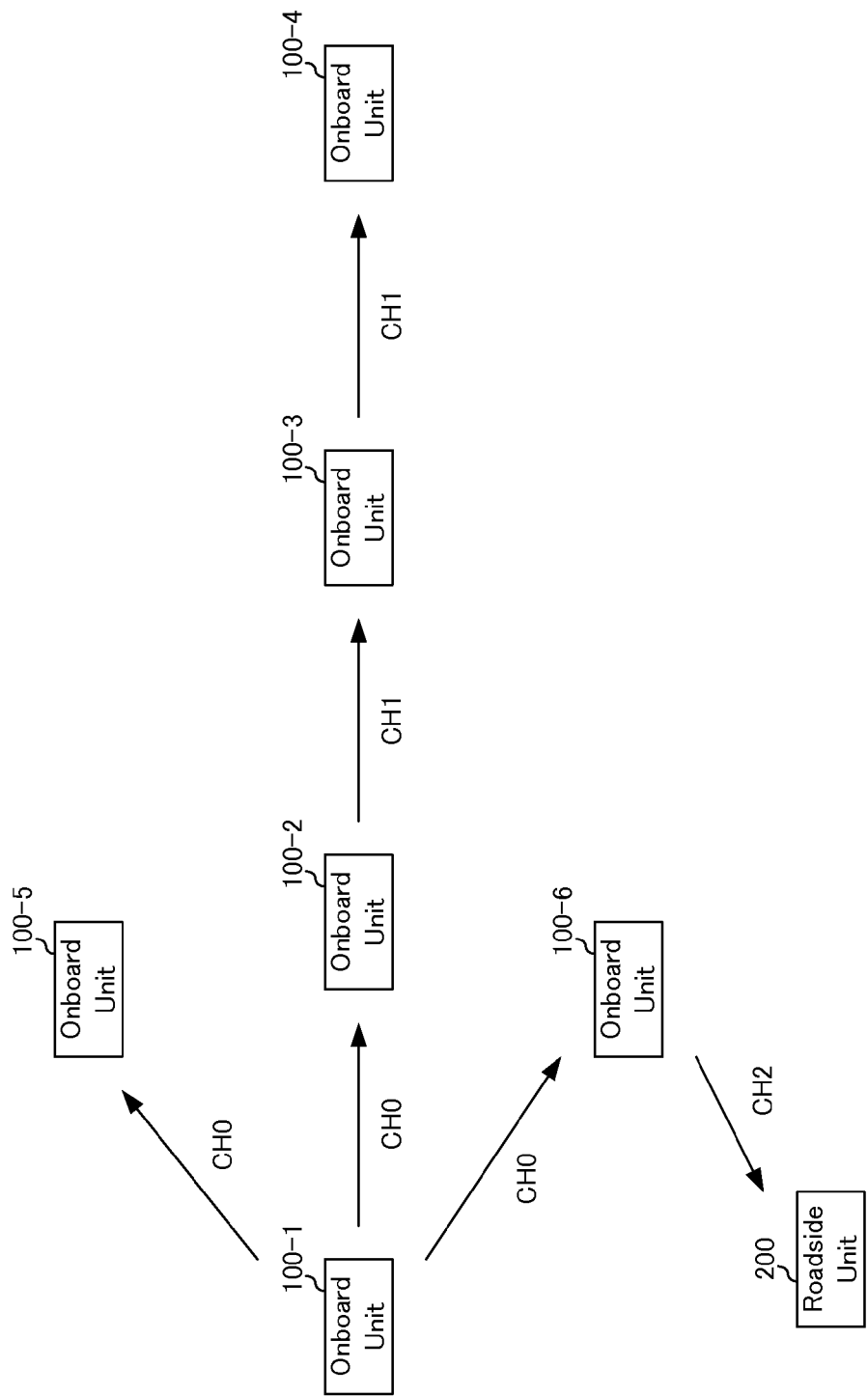
FIG. 2 is a diagram showing one mode of a system having a plurality of communication apparatuses of the present invention connected therein.

FIG. 2 is a diagram showing one mode of a system having a plurality of communication apparatuses of the present invention connected therein.

As shown in FIG. 2, this configuration includes onboard units 100-1 to 100-6 and roadside unit 200.

Onboard units 100-1 to 100-6 are communication apparatus (onboard units) that can commutate with one another and are mounted on vehicles to perform radio communication.

Onboard units 100-1 to 100-4 use two communication channels CH0 and CH1 as the communication channels. Onboard unit 100-1 performs communication with onboard units 100-2, 100-5 and 100-6 by use of communication channel CH0. Onboard unit 100-2 performs communication with onboard unit 100-3 by using communication channel CH1. Onboard unit 100-3 performs communication with onboard unit 100-4 by using communication channel CH1.

Onboard unit 100-5 uses communication channel CH0 only as the communication channel.

Onboard unit 100-6 uses two communication channels CH0 and CH2 as the communication channels. Onboard unit 100-6 performs communication with roadside unit 200 by using communication channel CH2.

Roadside unit 200 is a communication apparatus that performs radio communication using communication channel CH2 only.

In this configuration, the first hop (the first stage) uses CH0 while the second hop (second stage) and following hops use CH1.

Here, CH0 is a communication channel that can be used by all onboard units 100-1 to 100-6. On the other hand, CH1 is a communication channel that can be set up when the onboard unit can use two communication channels.

As shown in FIG. 2, data (multi-hop packets exchanged in multi-hop communication)transmitted from onboard unit 100-1 is transmitted as the first hop by using CH0 to onboard unit 100-2. Then, onboard unit 100-2 transmits (transfers) the data transmitted from onboard unit 100-1 to onboard unit 100-3 as the second hop by using CH1. Onboard unit 100-3, then transmits (transfers) the data transmitted from onboard unit 10-2 to onboard unit 1000-4 as the third hop by using CH1.

Figure 3:
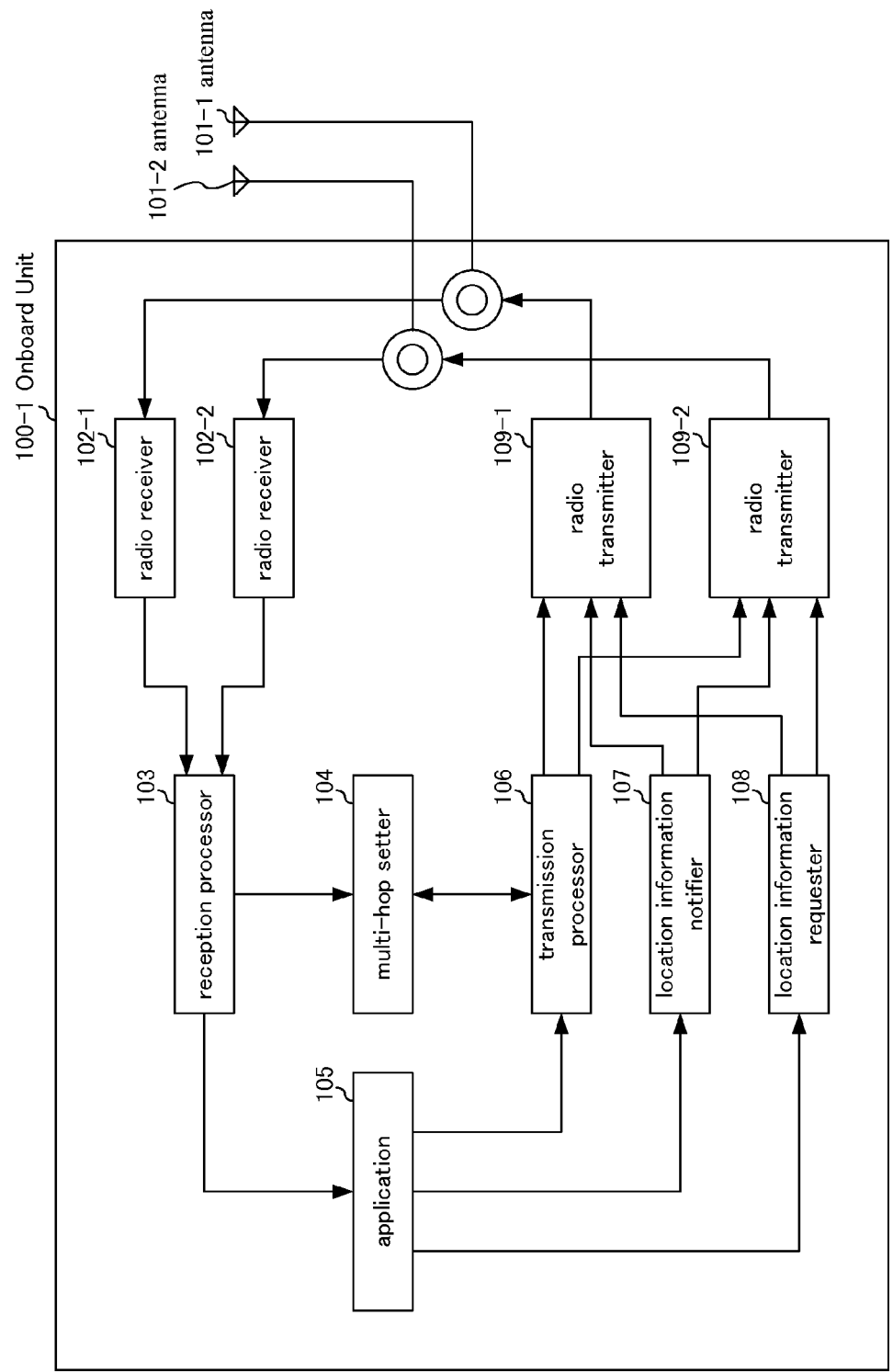
FIG. 3 is a diagram showing one example of an internal configuration of an onboard unit shown in FIG. 2.

FIG. 3 is a diagram showing one example of the internal configuration of onboard unit 100-1 shown in FIG. 2.

As shown in FIG. 3, onboard unit 100-1 shown in FIG. 2 includes antennas 101-1 and 101-2, radio receivers 102-1 and 102-2, reception processor 103, multi-hop setter 104, application 105, transmission processor 106, location information notifier 107, location information requester 108 and radio transmitters 109-1 and 109-2. Here, in FIG. 3, of the components included in onboard unit 100-1 shown in FIG. 2, only the components related to the present invention are shown. Further, onboard units 100-2 to 100-6 shown in FIG. 2 also include the components shown in FIG. 3.

Antennas 101-1 and 101-2 are typical antennas for transmitting and receiving radio waves.

Radio receiver 102-1 receives the radio signal transmitted through one of the two communication channels available for onboard unit 100-1 to perform communication, the first communication channel being CH0, by antenna 101-1. Radio receiver 102-1 outputs the received radio signal to reception processor 103.

Radio receiver 102-2 receives the radio signal transmitted through a channel other than the first channel of the two communication channels available for onboard unit 100-1 to perform communication, the second communication channel being CH1, by antenna 101-2. Radio receiver 102-2 outputs the received radio signal to reception processor 103.

Reception processor 103 outputs, from among the signals output from radio receivers 102-1 and 102-2, packets to be used by application 105 to application 105. Reception processor 103 extracts location information notifying packets including the location information representing onboard units 100-2 to 100-6 from the signals output from radio receivers 102-1 and 102-2 and outputs the packets to multi-hop setter 104. This location information notifying packets include usage channel information that represents communication channels being currently used by onboard unit 100-2 to 100-6. Further, needless to say, the location information notification packet includes the ID information (communication apparatus ID information) previously assigned to identify each onboard unit that transmitted that packet.

Multihop setter 104 extracts usage channel information included in the location information notifying packets transmitted from onboard units 100-2 to 100-6. Multi-hop setter 104 classifies and stores communication apparatus ID information included in the location information notification packets for every communication channel, based on the communication channels indicated by the extracted usage channel information. At this point, when the communication channels indicated by the usage channel information are the previously set first communication channel and second communication channel, multi-hop setter 104 classifies and stores the communication apparatus ID information included in the location information notifying packet as the first communication channel. This storing is realized by preparing a neighbor table that describes onboard units 100-2 to 100-6 that are capable of multi-hop communication for every communication channel. Further, multi-hop setter 104 may also be one that stores the communication apparatus ID information assigned to the onboard units that replied to the location information request that data be transmitted by location information requester 108. Multi-hop setter 104 also controls the hop number of the multi-hop network and sets up an additional destination to be addressed when the number of hops has not reached the limit. When transmission process 106 has inquired of multi-hop setter 104 about the onboard unit to which the multi-hop packet exchanged by multi-hop communication should be transmitted, by designating the communication channel, multi-hop setter 104 sends the communication apparatus ID information, that has been classified and stored as the designated communication channel, to transmission processor 106.

Application 105 is software that performs predetermined processes on the signals output from reception processor 103 and outputs the result to transmission processor 106.

Transmission processor 106 transmits (transfers) the multi-hop packet to the onboard units which have been assigned beforehand with communication ID information classified as the same communication channels as the preset two communication channels (CH0 and CH1) and stored in multi-hop setter 104. At this time, when onboard unit 100-1 receives the multi-hop packet via communication channel CH0, CH1 is used to transmit the multi-hop packet. On the other hand, when onboard unit 100-1 receives the multi-hop packet by using communication channel CH1, CH1 is used to transmit the multi-hop packet. That is, transmission processor 106 transmits a multi-hop packet by using CH0 when the multi-hop packet is transmitted in the first hop, whereas transmission processor 106 transmits (transfers) a multi-hop packet by using CH1 when the multi-hop packet is transmitted (transferred) in other than the first hop (in the second and following hops). Further, transmission processor 106 may transmit a multi-hop packet in unicast.

Specifically, when transmitting a multi-hop packet by using CH0, transmission processor 106 sends an inquiry to multi-hop setter 104 onboard units using CH0 and transmits the multi-hop packet to the onboard units through radio transmitter 109-1 and antenna 101-1. On the other hand, when transmitting a multi-hop packet by using CH1, transmission processor 106 sends an inquiry to multi-hop setter 104 onboard units using CH1 and transmits the multi-hop packet to the onboard units through radio transmitter 109-2 and antenna 101-2.

In order to notify the position of onboard unit 100-1, location information notifier 107 transmits the location information notifying packet to onboard units 100-2 to 100-6, by adding on the usage channel information that represents the communication channels that onboard unit 100-1 is using. At this time, location information notifier 107 transmits the location information notifying packet through radio transmitters 109-1 and 109-2 and antennas 101-1 and 101-2.

Location information requester 108 makes a request for the location information representing the locations of onboard units 100-2 to 100-6 to onboard units 100-2 to 100-6. This request may use a request signal (location information request data) that allows for recognition of this request. In this case, location information requester 108 transmits the request signal by way of radio transmitters 109-1, 109-2 and antennas 101-1, 101-2. Location information requester 108 may transmit the location information request data in broadcast by using CH0 in the first hop to onboard units 100-2 to 100-6 and transmit in broadcast by using CH1 in the second hop.

Radio transmitter 109-1 radios the signals (packets) output from transmission processor 106, location information notifier 107 and location information requester 108 via antenna 101-1 by using CH0.

Radio transmitter 109-2 radios the signals (packets) output from transmission processor 106, location information notifier 107 and location information requester 108 via antenna 101-2 by using CH1.

Next, the process by which onboard unit 100-1 acquires usage of the channel information that represents the communication channels that are being used by onboard units 100-2 to 100-6, in the configuration shown in FIG. 2, will be described.

When the location information request data is transmitted, as a request signal for requesting location information, from location information requester 108 of onboard unit 100-1, location information notifying packets including location information representing onboard units 100-2, 100-5 and 100-6 are transmitted from onboard units 100-2, 100-5 and 100-6. This location information notifying packet includes usage channel information that represents the communication channels that are being used by each of onboard units 100-2, 100-5 and 100-6. From this, onboard unit 100-1 can acquire usage channel information from onboard units 100-2, 100-5 and 100-6.

This usage channel information may be any form that allows the usage channels that are being used to be identified. For example, a one-bit flag may be provided for each channel, so as to indicate that two communication channels CH0 and CH1 are being used, by setting the flags for CH0 and CH1 ON and by setting the flags for other communication cannels OFF.

On the other hand, since no direct radio wave from onboard unit 100-1 reaches onboard units 100-3 and 100-4, onboard unit 100-1 cannot search them directly. Accordingly, the search will be made by way of onboard unit 100-2.

Figure 4:
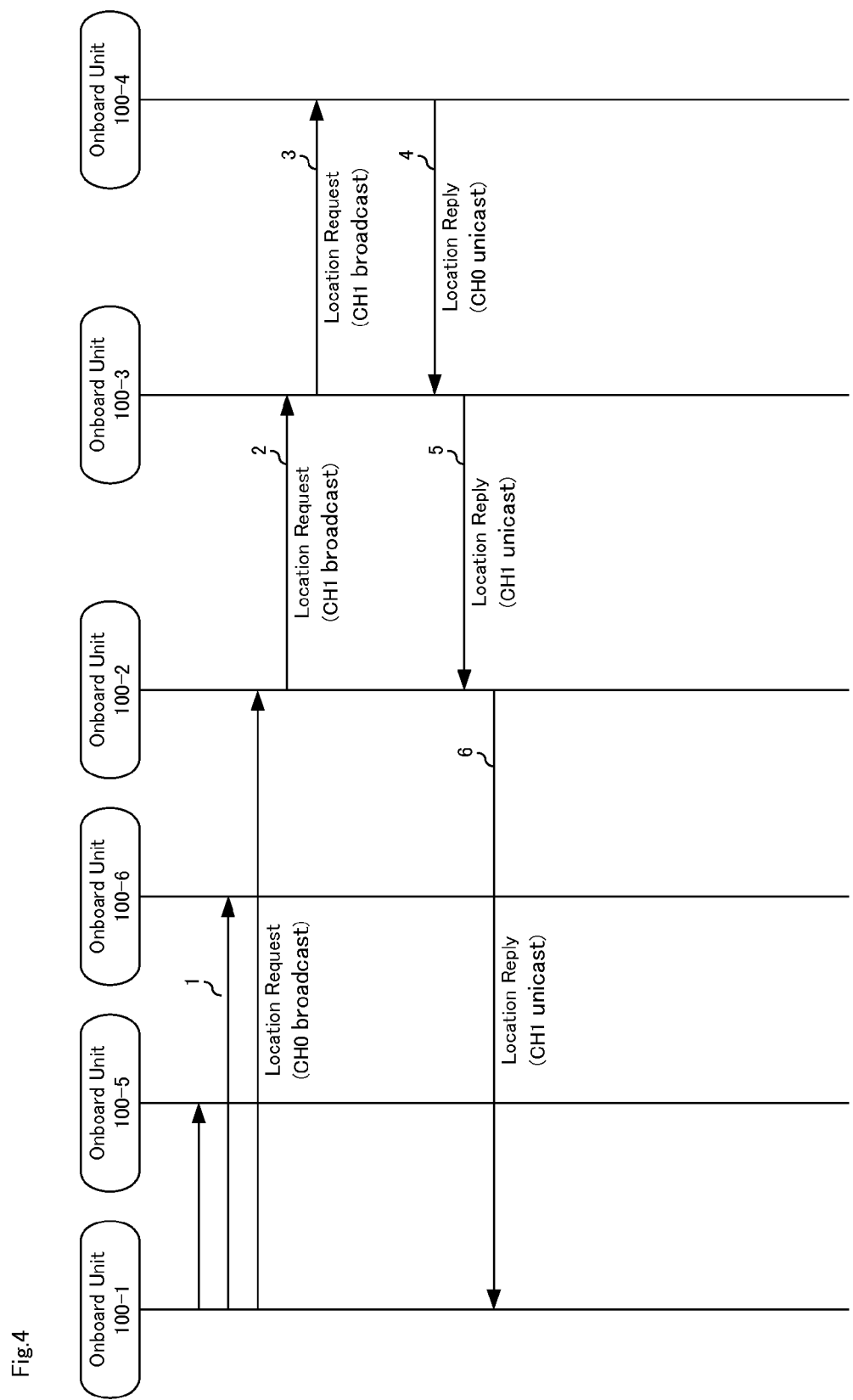
FIG. 4 is a sequence diagram for illustrating the process in which an onboard unit acquires usage channel information that represents the communication channels that another onboard unit is using, in the configuration shown in FIG. 2.

FIG. 4 is a sequence diagram for illustrating the process by which onboard unit 100-1 acquires usage channel information that represents the communication channels that onboard unit 100-4 is using, in the configuration shown in FIG. 2.

First, at Step 1, location information request data (Location Request) is transmitted, as a request signal for requesting location information, from location information requester 108 of onboard unit 100-1. At this time, the number of hops for searching onboard unit 100-4 is limited as three or so. If onboard unit 100-4 cannot be located within that number of hops, it is determined that no onboard unit 100-4 is present in that area.

Here, onboard unit 100-5 and 100-6 can receive a broadcast message but cannot re-send the message in the multi-hop network using CH1.

On the other hand, onboard unit 100-2 can transmit (transfer) the received message by using CH1, so that at Step 2, the message is transmitted (transferred) from onboard unit 100-2 to onboard unit 100-3 by using CH1.

Then, the message transmitted from onboard unit 100-2 is received by onboard unit 100-3, and the received message is transmitted (transferred) from onboard unit 100-3 to onboard unit 100-4 at Step 3. As a result, at least one route from onboard unit 100-1 to onboard unit 100-4 has been confirmed to be present.

Then, at Step 4, Location Reply, a replay message to Location Request, is transmitted from onboard unit 100-4 to onboard unit 100-1. This transmission may use either unicast or broadcast transmission. Referring to FIG. 4, an example will be described taking the case of unicast transmission. This transmission uses CH0. This Location Reply includes usage channel information representing the location information of onboard unit 100-4 and the communication channels that onboard unit 100-4 is using.

The Location Reply transmitted from onboard unit 100-4 is received by onboard unit 100-3 first. The received Location Reply is transmitted (transferred) from onboard unit 100-3 to onboard unit 100-2 by using CH1 at Step 5.

The Location Reply transmitted from onboard unit 100-3 is received by onboard unit 100-2. The received Location Reply is transmitted (transferred) from onboard unit 100-2 to onboard unit 100-1 by using CH1 at Step 6.

The process in which onboard unit 100-1 acquires usage channel information of onboard unit 100-3 is performed in the same manner.

As a result, onboard unit 100-1 recognizes that there exists a route up to onboard unit 100-4 and becomes able to acquire the usage channel information representing the communication channels that onboard unit 100-4 is using.

Next, the method of storing the usage channel information thus acquired into multi-hop setter 104 of onboard unit 100-1 will be described.

Figure 5:
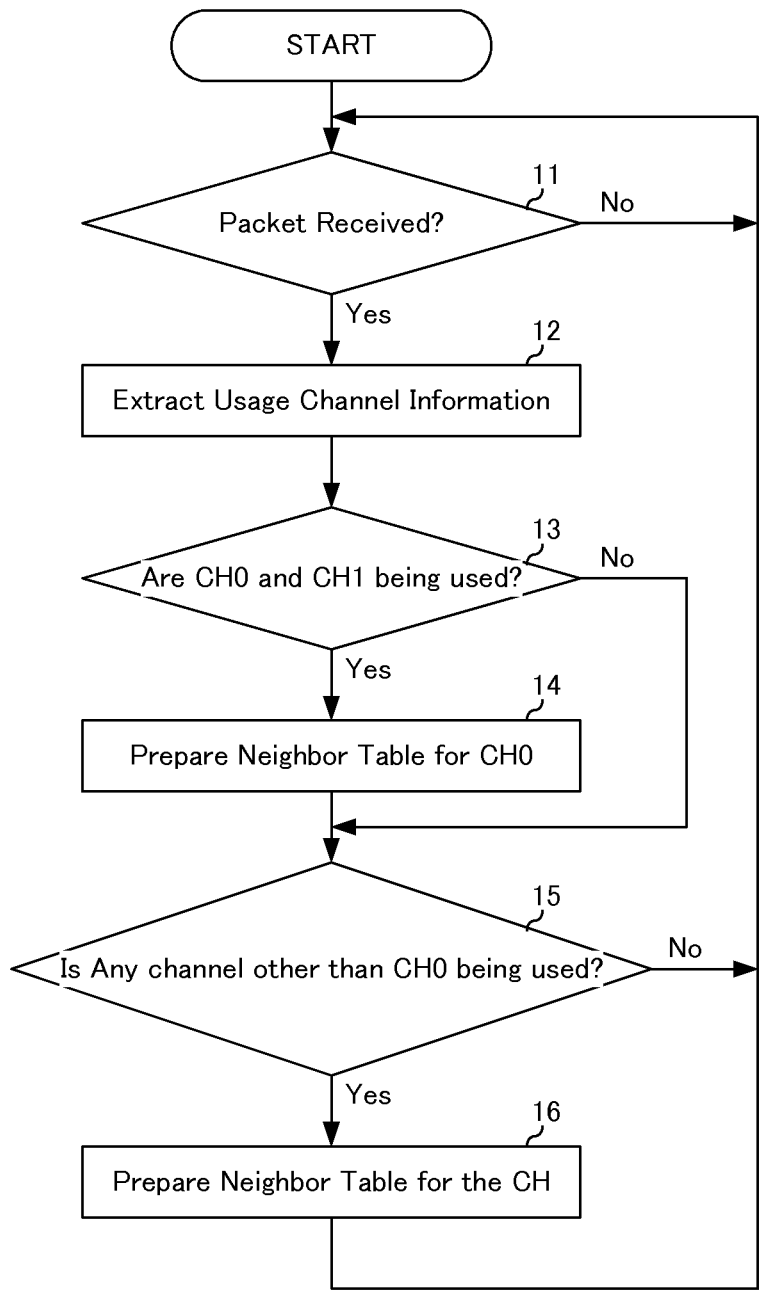
FIG. 5 is a flow chart for illustrating the method of storing usage channel information into a multi-hop setter shown in FIG. 3.

FIG. 5 is a flow chart for illustrating the method of storing usage channel information into multi-hop setter 104 shown in FIG. 3. Description herein will be made taking an example in which the first hop is designated to use CH0 and in which the second and following hops are designated to use CH1, as the communication channels.

First, at Step 11, when it is determined at reception processor 103 that packets (location information notifying packets) transmitted from onboard units 100-2 to 100-6 have been received, usage channel information is extracted from those packets at Step 12. The extracted usage channel information is output from reception processor 103 to multi-hop setter 104.

Then, at Step 13, it is determined by multi-hop setter 104 whether the usage channel information output from reception processor 103 is information that represents use of two communication channels CH0 and CH1.

When the usage channel information is information that represents use of two communication channels CH0 and CH1, a neighbor table as to CH0 is prepared by multi-hop setter 104 at Step 14. Specifically, the communication apparatus ID information assigned to the onboard unit that has transmitted the usage channel information is stored in multi-hop setter 104 in association with communication channel CH0 (classified as CH0).

Subsequently, it is determined by multi-hop setter 104 at Step 15 whether the usage channel information output from reception processor 103 is information that represents use of communication channels other than CH0.

On the other hand, when it is determined at Step 13 that the usage channel information is not information that uses two communication channels CH0 and CH1, Step 15 is implemented by skipping Step 14.

When it is determined at Step 15 that the usage channel information is information that represents use of communication channels other than CH0, neighbor tables relating to the communication channels that are being used are prepared by multi-hop setter 104 at Step 14. Specifically, the communication apparatus ID information assigned to the onboard unit that has transmitted the usage channel information is stored in multi-hop setter 104 in association with communication channels (classified based on the communication channel that is being used). Neighbor tables are prepared to match the number of communication channels that are being used. For example, when the usage channel information represents use of two communication channels CH2 and CH3, one neighbor table relating to CH2 and another neighbor table relating to CH3 are prepared. Specifically, the communication apparatus ID information assigned to the onboard unit that has transmitted the usage channel information is stored in multi-hop setter 104 in association with communication channels CH2 and CH3 (classified in CH2 and CH3).

Then, the process at Step 11 is executed once again.

On the other hand, when it is determined at Step 15 that the usage channel information is not information that uses communication channels other than CH0, Step 1 is executed once again by skipping Step 16.

Here, in the present invention, although neighbor tables that relate to multi-hop transmission are specified, details that relate to the preparation and structure of neighbor tables that recognize ordinary neighboring onboard units are not specified. Usually, neighbor tables for neighboring onboard units are prepared from the packets received by use of CH0.

Thanks to the thus described series of processing operations, the neighbor table for CH0 is prepared only when two communication channels CH0 and CH1 are being used at the same time, whereas when other communication channels than CH0 are being used, the neighbor tables for those communication channels are prepared.

In the configuration shown in FIG. 2, in the neighbor table relating to the multihop transmission of onboard unit 100-1, onboard units 100-2, 100-3 and 100-4 are classified and registered for CH0 and CH1, and onboard unit 100-6 is classified and registered for CH2. On the other hand, since onboard unit 100-5 uses CH0 only, it is not registered in the neighbor tables.

Next, the process when onboard unit 100-1 shown in FIG. 2 transmits a multi-hop packet will be described.

Figure 6:
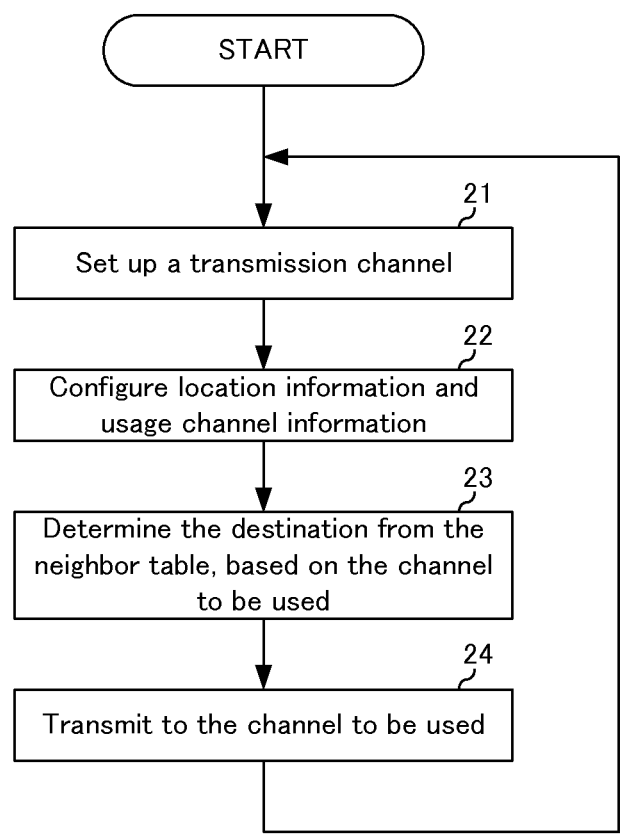
FIG. 6 is a flow chart for illustrating the process when the onboard unit shown in FIG. 2 transmits a multi-hop packet.

FIG. 6 is a flow chart for illustrating the process when onboard unit 100-1 shown in FIG. 2 transmits a multi-hop packet.

First, at Step 21, the communication channel to be used for transmitting multi-hop packets is set up in transmission processor 106. At Step 22, location information and the communication channel therefor are set up at Step 22. Herein, the following description will be made taking an example where CH0 is designated to be used in the first hop and CH1 in the second and following hops. Further, the example is described taking a case where onboard units 100-1 to 100-4 use two communication channels CH0 and CH1 at the same time.

Then, an inquiry about the onboard units allotted with communication apparatus ID information that is classified and registered in the neighbor table for CH0 is made from transmission processor 106 to multi-hop setter 104. At Step 23, based on the multi-hop setter 104's reply to the inquiry, the destination is determined by transmission processor 106. In this case, as described above the communication apparatus ID information on the onboard units that are using two communication channels CH0 and CH1 is classified and registered in the neighbor table for CH0. Accordingly, the fact that onboard units 100-2 to 100-4 are the targets of multi-hop packet transmission is recognized by transmission processor 106. Further, from the location information, the fact that transmission to the adjacent onboard unit 100-2 is the first hop is recognized by transmission processor 106.

Then, at Step 24, a multi-hop packet is transmitted from transmission processor 106 via radio transmitters 109-1, 109-2 and antennas 101-1, 101-2, by using CH0 if in the first hop and by using CH1 if in the second and following hops.

As described heretofore, the neighbor table is prepared such that any onboard unit not using CH1 that should be used for the second and following hops will not be selected as a candidate for the first hop when onboard unit 100-1 tries to transmit a multi-hop packet to onboard unit 100-4. Since onboard units 100-5 and 100-6 cannot use CH1, these units are not included as the multi-hop target classified for CH0, which is used for the first hop, in the registered neighbor tables.

As described heretofore, the usage channel information representing the communication channels that are being currently used is added on to the ordinarily exchanged location information notifying packet and transmitted therewith. As a result, the onboard unit having received this usage channel information can distinguish onboard units that cannot participate in multi-hop networks and perform multi-hop communication by making use of onboard units that can participate in multi-hop networks, only. It is also possible to ensure that a multi-hop packet that has been transmitted reaches its destination.

Further, consideration is also given to realizing reliable multi-hop by changing how multi-hop channels are used between broadcast and unicast transmissions.

Figure 7:
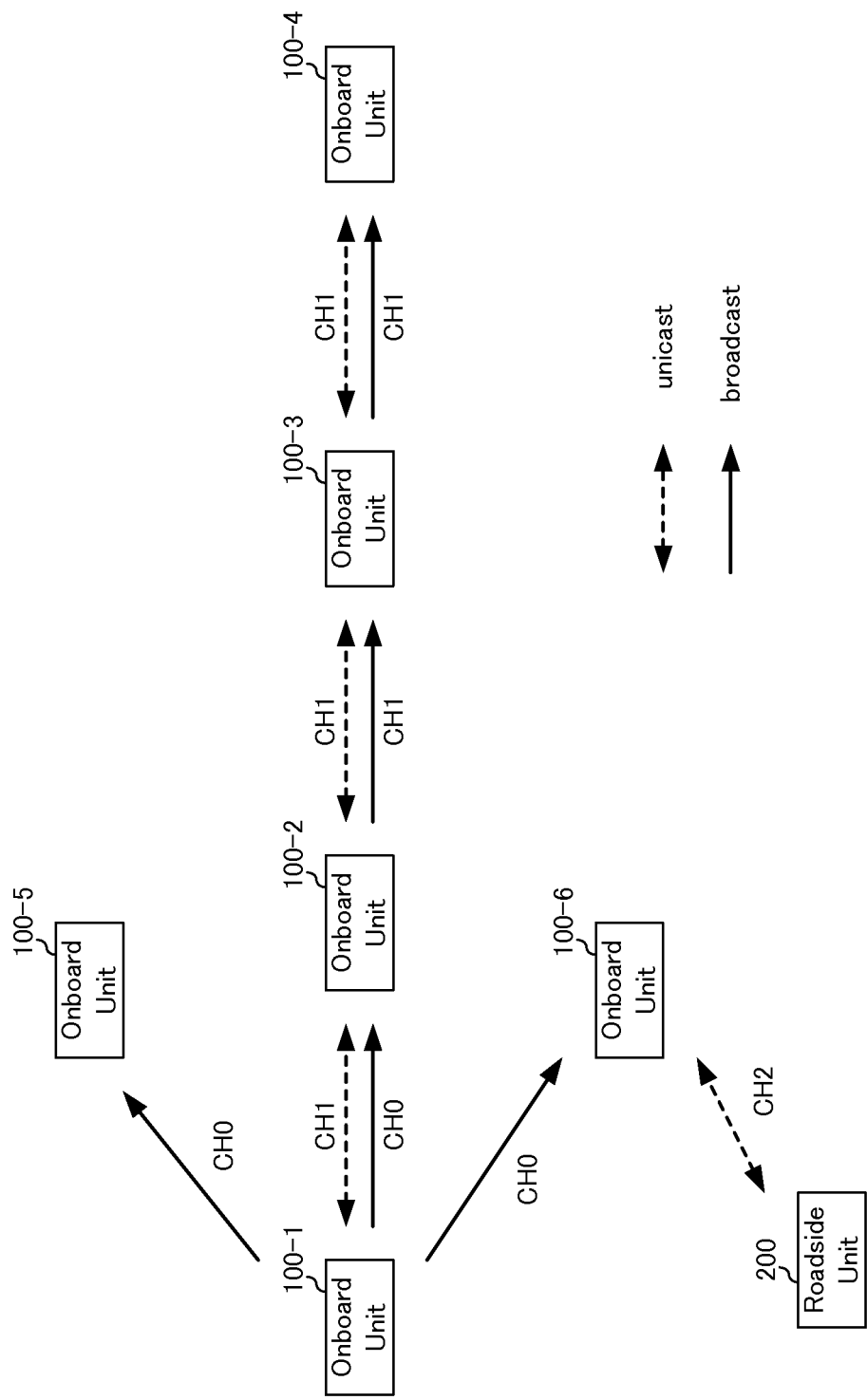
FIG. 7 is a diagram showing another mode of a system having a plurality of communication apparatuses of the present invention connected therein.

FIG. 7 is a diagram showing another mode of a system that has a plurality of communication apparatuses of the present invention connected therein. Differently from the mode shown in FIG. 2, this configuration is characterized by changing how multi-hop channels are used between unicast and broadcast messages. In FIG. 7, unicast messages are shown by the broken line and broadcast messages are shown by the solid line.

As shown in FIG. 7, when a broadcast message is handled, similarly to the mode in FIG. 2 the setup of using two communication channels is used as is: CH0 is used for the first hop and CH1 is used for the second and following hops.

A transmitted broadcast message can be received by a plurality of onboard units. Accordingly, it is possible to transmit a broadcast message without regard to whether the next relaying onboard unit can perform multi-hop. Only when an onboard unit, that has received this broadcast message, is able to perform multi-hop, may the onboard unit transfer the message to the subsequent onboard unit.

On the other hand, when a unicast message is handled, it is necessary to determine relaying onboard units. Further, if an onboard unit that cannot deal with multi-hopping gets in the way, communication cannot be established To deal with this, the communication channel to be used for transmission of unicast messages is uniquely set so that if CH1 is used, all the onboard units should use CH1, whereas if CH2 is used, all the onboard units should use CH2. For the case of a unicast message, that differs from the case of a broadcast message, it is necessary to search for a target onboard unit beforehand, and in this stage, an onboard unit that cannot use the communication channel by which the unicast message is determined to be transmitted will not be selected as a relay station.

Next, the process before the start of transmission of a unicast message from onboard unit 100-1 to onboard unit 100-4 in the configuration shown in FIG. 7 will be described.

Figure 8:
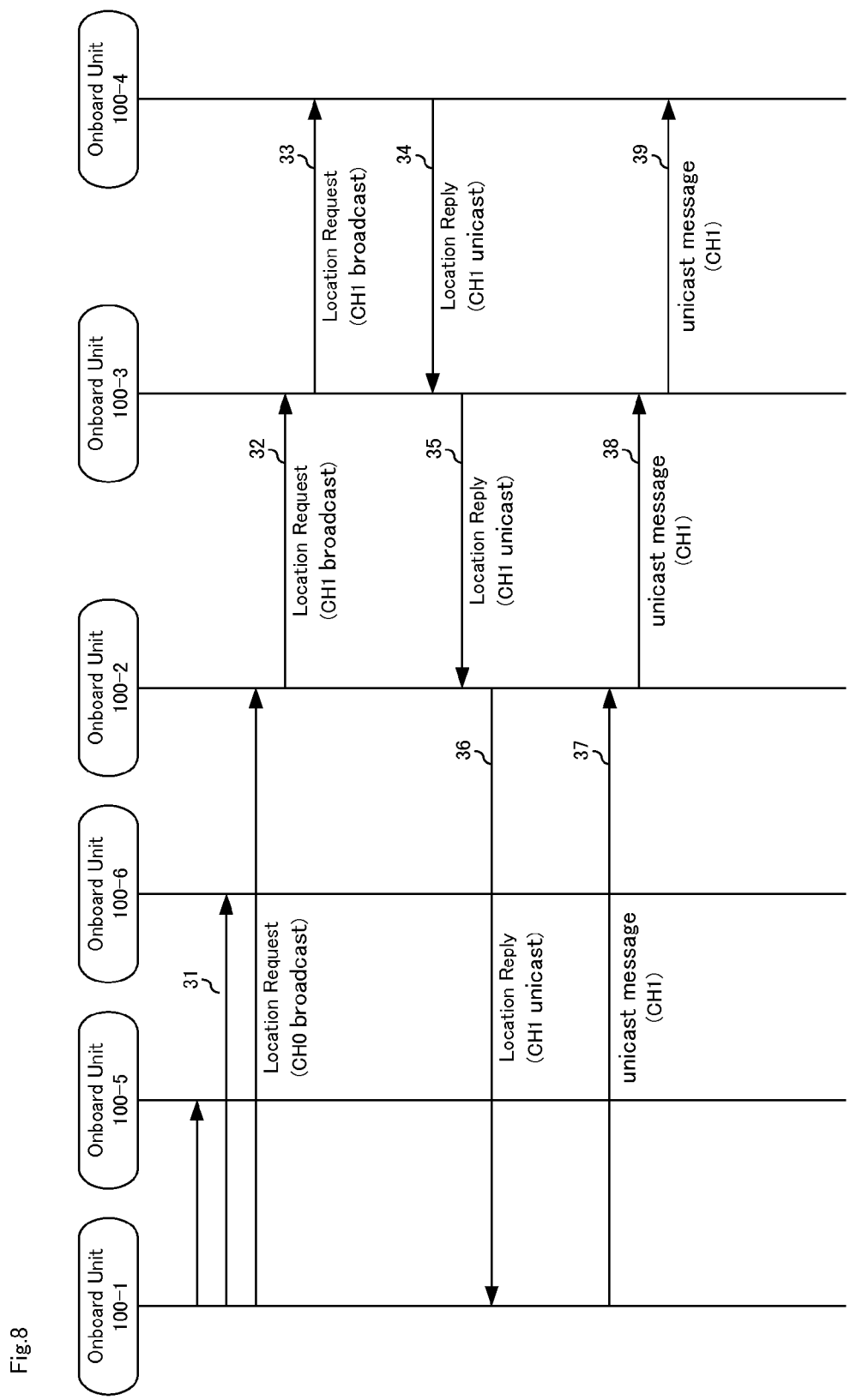
FIG. 8 is a sequence diagram for illustrating the process before the start of transmission of a unicast message from an onboard unit to another onboard unit in the configuration shown in FIG. 7.

FIG. 8 is a sequence diagram for illustrating the process before the start of transmission of a unicast message from onboard unit 100-1 to onboard unit 100-4 in the configuration shown in FIG. 7.

When a unicast message starts to be transmitted by using CH1, at Step 31 a Location Request message is transmitted first, in broadcast from location information requester 108 by using CH0, so as to search for a route to reach onboard unit 100-4.

Since onboard units 100-5 and 100-6 do not use CH1, these unit cannot receive this message.

On the other hand, onboard unit 100-2 can receive this message. Then, in order to search for onboard unit 100-4 in the multi-hop network, the same Location Request message is transmitted again at Step 32 from onboard unit 100-2 to onboard unit 100-3 in broadcast.

Similarly, at Step 33, the same Location Request message is transmitted from onboard unit 100-3 in broadcast, and this location Request reaches onboard unit 100-4.

Then, at Steps 34 to 36, a Location Reply message is sent back to onboard unit 100-1 from location information notifier 107 of onboard unit 100-4 that received the Location Request message, by way of onboard units 100-3 and 100-2. This message is sent back in unicast.

As a result, at Steps 37 to 39, onboard unit 100-1 can recognize the onboard units through which a unicast message should be transmitted to onboard unit 100-4, hence can send the unicast message to onboard unit 100-4 without passing through onboard units 100-5 and 100-6 for which CH1 is unavailable.

As described heretofore, by switching the ways of using communication channels between the unicast message and the broadband message, onboard units to be used in unicast mode are searched for every time even if onboard units are present that cannot participate in multi-hop network. As a result, it is possible to perform multi-hop using only the onboard units that can participate in multi-hop.

The process that each component, that is provided in the above-described onboard unit 100-1, performs may be realized by a logical circuit produced depending on purposes. Alternatively, a computer program (which will be referred to hereinbelow as program) describing the sequence of the processing contents is recorded on a recording medium that can be read by onboard unit 100-1, so that the program recorded on this recording medium can be loaded in onboard unit 100-1 and executed thereby. Examples of the recording medium that can be read by onboard unit 100-1 include removable recording media such as floppy (registered trademark) disks, magneto optical disks, DVDs, CDs, etc., and HDDs and memories such as ROM, RAM and the like incorporated in onboard unit 100-1. The program recorded on the recording medium is read by the CPU (not shown) provided for onboard unit 100-1, and the same operations described above are carried out by the control of the CPU. Here, CPU operates as a computer for executing the program loaded from the recording medium with the program recorded thereon.

Although the present invention has been explained with reference to the exemplary embodiments, the present invention should not be limited to the above exemplary embodiment of the invention. Various modifications that can be understood by those skilled in the art may be made to the structures and details of the present invention within the scope of the present invention.

This application claims priority based on Japanese Patent Application No. 2010-279330, filed on Dec. 15, 2010, and should incorporate all the disclosure thereof herein.

The invention claimed is:

1. A communication apparatus performing radio communication comprising:
   a location information notifier that adds on usage channel information representing the communication channels that the communication apparatus is using, to a location information notifying packet to be transmitted to notify the location of the communication apparatus and transmits the location information notifying packet to another communication apparatus that can communicate with the subject communication apparatus; and,
   a transmission processor that, when the communication channels represented by the usage channel information included in the location information notifying packet transmitted from the other communication apparatus are the same as the previously set two communication channels, transmits a multi-hop packet transmitted and received by multi-hop communication, to the communication apparatus.

2. The communication apparatus according to claim 1, wherein the transmission processor, when transmitting the multi-hop packet in the first hop, uses a first communication channel that is previously set as a communication channel to be used for the first hop, of the two communication channels to transmit the multi-hop packet, and when transmitting the multi-hop packet in other than the first hop, uses a second communication channel other than the first communication channel, of the two communication channels to transmit the multi-hop packet.

3. The communication apparatus according to claim 2, further comprising:
   a multi-hop setter that, when the communication channels represented by the usage channel information added on the location information notifying packet transmitted from the other communication apparatus are the first communication channel and the second communication channel, classifies the communication apparatus ID information previously assigned to the communication apparatus that has transmitted the location information notifying packet as the first communication channel and stores the information,
   wherein the transmission processor transmits the multi-hop packet to the communication apparatus represented by the communication apparatus ID information classified as the first communication channel and stored in the multi-hop setter.

4. The communication apparatus according to claim 3, further comprising:
   a location information requester that transmits location information request data for requesting the location notice to the other communication apparatus in broadcast, by use of the first communication channel in the first hop, and by use of the second communication channel in the second hop,
   wherein the multi-hop setter stores the communication apparatus ID information assigned to the communication apparatus which has replied to the location information request data, and
   the transmission processor transmits the multi-hop packet in unicast.

5. The communication apparatus according to claim 1, which is an onboard unit mounted on a vehicle.

6. A communication method for performing radio communication between communication apparatuses, comprising the steps of:
   adding on usage channel information representing the communication channels that the communication apparatus is using, to a location information notifying packet to be transmitted to notify the location of the communication apparatus and transmitting the location information notifying packet to another communication apparatus that can communicate with the subject communication apparatus; and,
   when the communication channels represented by the usage channel information included in the location information notifying packet transmitted from the other communication apparatus are the same as the previously set two communication channels, transmitting a multi-hop packet transmitted and received by multi-hop communication, to the communication apparatus.

* * * * *